United States Patent Office.

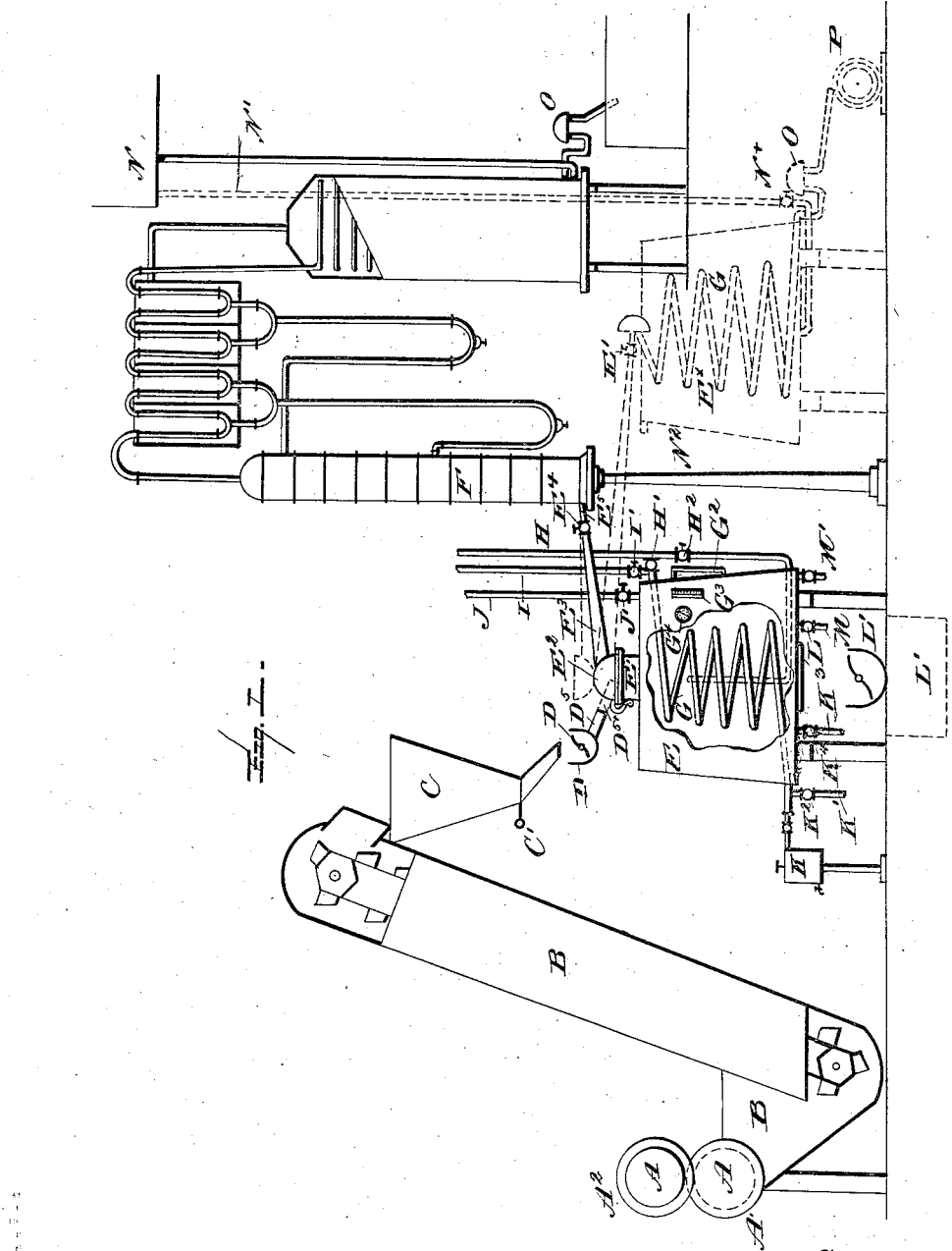

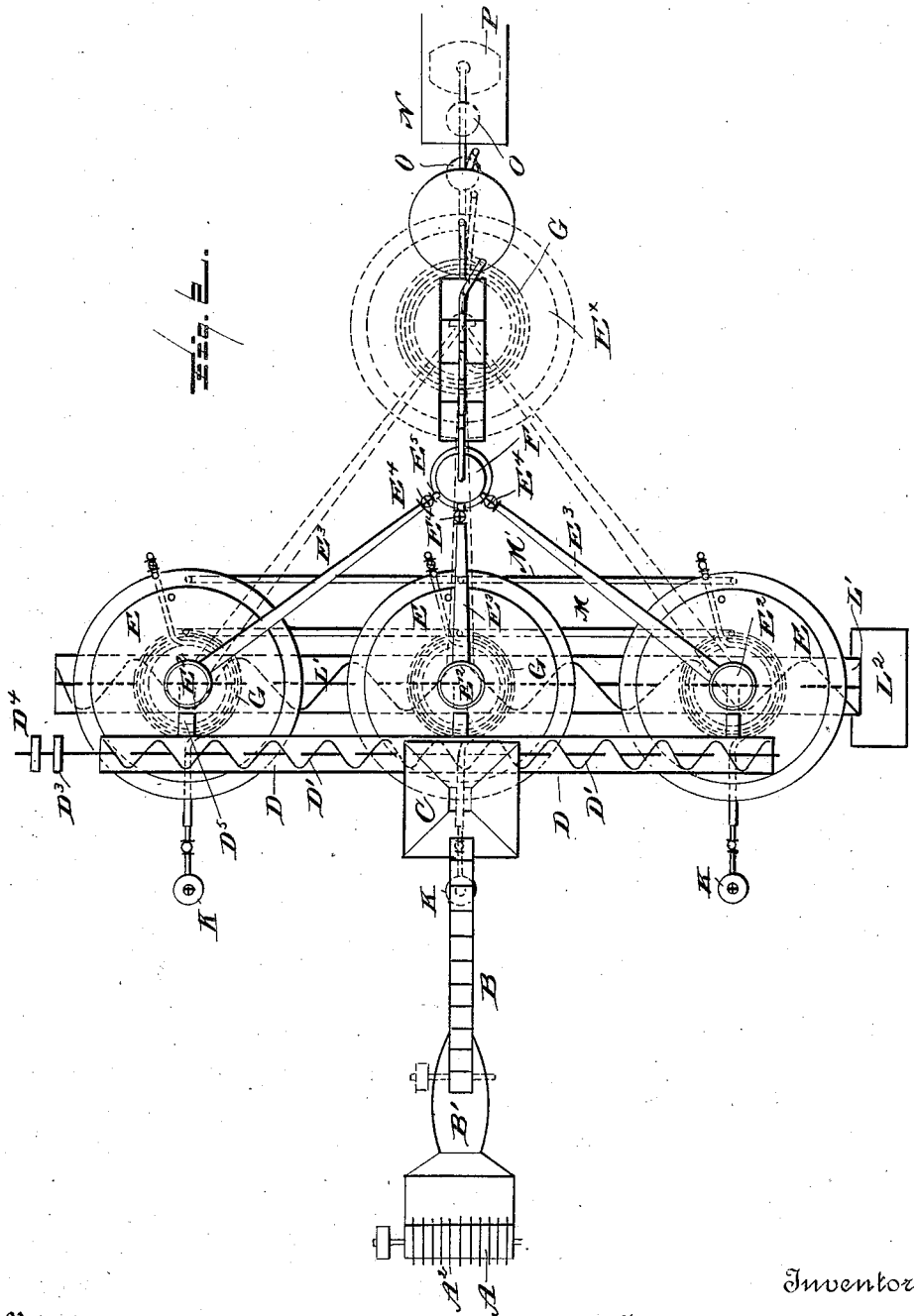

GASTON DESCAMPS, OF HAVANA, CUBA, ASSIGNOR OF ONE-HALF TO GEORGES DESCAMPS, OF NEW ORLEANS, LOUISIANA.

APPARATUS FOR MANUFACTURING ALCOHOL FROM SUGAR-CANE.

SPECIFICATION forming part of Letters Patent No. 451,679, dated May 5, 1891.

Application filed May 5, 1890. Serial No. 350,666. (No model.)

*To all whom it may concern:*

Be it known that I, GASTON DESCAMPS, a citizen of France, residing at Calle de Peñon No. 6, Havana, Cuba, have invented certain new and useful Improvements in Apparatus for Manufacturing Alcohol from Sugar-Cane, of which the following is a specification, reference being had therein to the accompanying drawings.

This invention has reference to a method of and apparatus for manufacturing alcohol directly from sugar-cane, sorghum-cane, and other plants the stems of which contain saccharine substances, and this without primarily expressing the juice from such stems, whereby there is avoided a percentage of loss of the saccharine matters which are retained in the stems after the ordinary methods of expressing the juice therefrom.

In my method and in the apparatus which I have constructed to practice the same the entire substance of the cane is subjected to treatment, so that the per centage of alcohol obtained is materially increased and the per centage of loss materially decreased.

Referring to the drawings, Figure 1 is a side elevation with portions broken away to show interior construction, and Fig. 2 is a plan of an apparatus constructed in accordance with my invention and for practicing my invention.

Like letters refer to like parts in all the figures.

I will proceed to describe my method and my apparatus, incidentally setting up advantages connected therewith, and will finally particularly point out the novel features of the invention in the claims.

A A represent cutting or disintegrating machinery, which may be of any desired construction that will cut, break, disintegrate, or separate the stems or saccharine plants into small pieces or shreds without materially expressing therefrom the juice or saccharine matter. I remark that at this stage of the process even absolute or partial crushing would not be objectionable, provided the crushed stems be passed, together with the juice, into the apparatus. In this instance I have illustrated, therefore, only one form of disintegrating or preparatory mechanism, and it consists in two rollers A A, the one being grooved, as at A', and the other being provided with annular blades $A^2$, arranged to enter the grooves A', and these blades and grooves are disposed lengthwise of the rollers and at suitable distances apart to serve the purpose of cutting a stem or stems transversely into small pieces. These rollers may be driven by any suitable system of gearing which may be extended to the operating-shaft of the elevator hereinafter described, or the whole may be operated by any suitable mechanism.

B is an elevator of any desired construction, into the hopper B' of which the stems are delivered from the disintegrating mechanism, so as to be elevated to and delivered into a supply-hopper C, having a gate C' to regulate the delivery of stems therefrom. The stems are delivered in suitable charges from the supply-hopper C into a horizontally-arranged conveyer-trough D, the conveyer D' of which is adapted to feed in both directions from its center, at which point the delivery-spout of the supply-hopper is located. This direction of delivery may be determined, as is usual, by changing the angle of the blades of the propeller; or, as shown in Fig. 2, the belting from the pulleys $D^3$ $D^4$ to any motive power may be arranged to drive the conveyer in opposite directions at intervals, as desired. The conveyer-trough has delivery-spouts $D^5$ at points along the same agreeing with the number of vats in the system.

E represents one vat of the system, of which there are three in this case, which number may be increased or decreased, as desired, in accordance with the desired capacity of the plant.

Referring to Fig. 1, E' represents a hollow cylinder mounted upon and communicating with the body of the vat E. This cylinder is provided with a cap $E^2$, which is adapted by any suitable fastening devices and interposed packing to be securely mounted upon the cylinder, in an air and steam tight manner. The fastening devices should be such as to permit of the ready separation of the cap and cylinder in order that the material to be treated may be delivered from the conveyer-trough through the spout $D^5$ and a telescopic section D³ˣ. (Shown in dotted lines.) The latter, when the cap is removed, is extended into and over the cylinder to conduct the material within the vat E.

The cap E² is provided with a pipe E³, which terminates in a swivel-joint and stop-cock or valve E⁴, which communicates by a pipe E⁵ with an ordinary column F; or, if desired, and as illustrated by dotted lines in Figs. 1 and 2, the pipe E³ may be extended to and connected in like manner with a secondary vat Eˣ, whereby the products of the operation performed in the vat E or a series thereof may be treated as hereinafter described.

The vat E is provided with a worm G and, if desired, with a perforated stand-pipe G', both of which are adapted to be supplied with steam from a steam-supply pipe H, there being interposed valves H' and H², respectively, for the purpose of regulating the admission of steam through the worm and the pipe. Between the valve H'' and the vat there is connected to the worm a pipe I, having a valve I', by which water may be admitted into and through the worm.

A pipe J is provided with a valve J' and communicates with the vat E. This is the water-pipe, and the purpose is for conducting water into the vat. The worm G terminates in a steam-trap K, which may be of any usual construction, and between the vat and trap there is a discharge-pipe K', having a valve K². The vat is also provided with a similar pipe and valve K³ K⁴, respectively. It is also provided with a discharging-door L, arranged over a conveyer-trough L', which extends under the entire series of vats in the plant and terminates in a receptacle or car L². A water-gage G², a thermometer, and a steam-pressure gage G⁴ are each properly connected with the vat m to perform each its well-known function of indicating the quantity, temperature of the contents of the vat, and the steam-pressure therein, respectively.

M represents a pipe provided with valves, as shown, which pipe extends from one vat to another of the series, there being a valve interposed between the pipe and each vat which it is made to communicate with. By this pipe and valves any one vat of the series may be put into communication with any other, so as to deliver contents from one to the other, or the contents may be delivered from one to any one of the series.

M' represents a pipe provided with valve, as shown, which pipe extends from one vat to the other, there being a valve interposed between the pipe and each of the series which it is made to communicate with. By this pipe and valves any one vat of the series may be put into communication with another, so as to deliver the contents remaining after a charge is distilled into another vat to be mixed with a fresh charge before distillation.

The operation of the device as thus far described is as follows: The comminuted, disintegrated, cut, or otherwise separated stems being delivered in a suitable quantity into one of the vats of the series, the cap E² is closed steam-tight by semi-rotating it from the position shown in dotted lines to the position shown in full lines in Fig. 1. The cap is thus brought into the position to be closed. A suitable quantity of water is admitted through the pipe J into the vat. The valve J' is closed, as are all the valves in all of the pipes communicating with the vat. Steam is now conducted through the pipe by opening valve H' into the worm G, and if it be desired to hasten the cooking or fermentation of the contents of the vat steam may be also introduced by means of pipe G' and valve H². After a charge has been subjected to the desired or required temperature for the desired or required time to produce fermentation in the contents of the vat, the proper temperature being carefully guarded (by means of the thermometer connected with the vat) and reduced when necessary by introduction of water through the pipe I and valve I' into and through worm G and out by way of the pipe K', as hereinafter described, then when fermentation is completed the mass is in a condition for distilling. This is accomplished by heating the mass by introducing steam either by the pipe H and worm G or by the pipe G', or, if desired, by both, when the alcoholic vapors will be conducted by the pipe E³ either into the rectifier-column F and its usual appendages or to the condenser Eˣ in accordance with the purpose of producing high-wines or alcohol of a predetermined percentage of purity. By means of pipe M and other connection with the various vats of the series the fermentation process in any one of the vats may be expedited by the introduction therein through that pipe of a portion of a mass in another vat wherein fermentation has already been established. This is a considerable advantage in hastening the process as a whole in a plant where numerous vats are employed, and in like manner by the use of pipe M' the low products of distillation—viz., those of low alcoholic degree—can be conducted from the tank of deposit to any one vat and mixed with the mass or with fresh charges, so as to be subjected to the process of distillation, and thus to contribute to the quantity of alcohol produced from a given mass of material. In like manner, when it is desired to produce a high degree and refined alcohol, the products of first distillation are conveyed from the tanks of deposit through pipe M' to any one vat of the series previously cleaned and washed perfectly, and therein subjected to distillation by communicating with the vat with the rectifier-column F, using cape F² and pipe F³. When it is desired to produce not condensed or not concentrated alcoholic products without refining the same, the alcoholic vapors from each vat of the series in the plant are conveyed to a single condenser Eˣ in worm G, where, by means of water from vat N through pipe N', controlled by valve $N^x$ and conducted into the vat, said vapors are condensed, the water flowing from the vat at the overflow $N^2$ at its top.

Q represents a glass chamber in the delivery-pipes, in which is a gage and alcohometer, whereby the quantity and strength of the product is ascertained, and from which by any suitable means said product is collected in a vat, barrel, or other desired receptacle P.

Having described my invention, what I claim is—

1. In an apparatus of the class described, the combination of mechanism for separating the material into fragments, an elevator, a series of fermenting-vats, a screw conveyer arranged above the vats and adapted to deliver the material in opposite directions to the same, and an intermediate conductor for delivering the material from the elevator to the conveyer, substantially as specified.

2. In an apparatus of the class described, in combination with a fermenting-vat, a detachable cap provided with a pipe having a rotatable connection with an apparatus for treating alcoholic vapor, substantially as specified.

3. In an apparatus for producing alcohol from saccharine matters, a disintegrating, severing, and separating mechanism for dividing the material into fragments and collecting the same and its juice, a series of fermenting-vats, pipes having controlling-valves extending from each vat of the series to the others, a worm arranged in each vat of the series and communicating at its upper end with a water-pipe and with a steam-pipe, each having controlling-valves, removable caps mounted one on each vat of the series, and pipes extending from each cap to a single distilling-column, substantially as and for the purpose specified.

In testimony whereof I affix my signature in presence of two witnesses.

GASTON DESCAMPS.

Witnesses:
JOSEPH A. SPRINGER,
K. S. CAY.